United States Patent [19]

Blom

[11] Patent Number: 4,470,665

[45] Date of Patent: Sep. 11, 1984

[54] SEGMENTED MIRROR

[75] Inventor: C. James Blom, Bakersfield, Calif.

[73] Assignee: Roxor Corporation, Bakersfield, Calif.

[21] Appl. No.: 385,544

[22] Filed: Jun. 7, 1982

Related U.S. Application Data

[60] Division of Ser. No. 233,106, Feb. 10, 1981, Pat. No. 4,368,951, which is a continuation-in-part of Ser. No. 109,970, Jan. 7, 1980, abandoned.

[51] Int. Cl.³ ............................................. G02B 5/08
[52] U.S. Cl. .................................. 350/292; 350/291; 350/320; 350/303
[58] Field of Search ............... 350/292, 299, 452, 109, 350/97, 291, 171, 174, 303, 304; 272/8 M, 8.5

[56] References Cited

U.S. PATENT DOCUMENTS

| 3,173,985 | 3/1965 | Wendel | 272/8 M |
| 3,528,730 | 9/1976 | Saxon | 350/299 |
| 3,806,233 | 4/1974 | Stefano | 350/299 |

FOREIGN PATENT DOCUMENTS

| 26752 | 11/1964 | German Democratic Rep. | 350/167 |
| 1155 | 3/1916 | Netherlands | 350/292 |
| 1546082 | 5/1979 | United Kingdom | 350/292 |

Primary Examiner—Jon W. Henry
Attorney, Agent, or Firm—William W. Haefliger

[57] ABSTRACT

A mirror comprises a myriad of reflecting surfaces so aligned as to produce a virtual image which may be plain or focused. The surfaces may be irregular in outline to minimize or prevent glint patterns.

28 Claims, 32 Drawing Figures

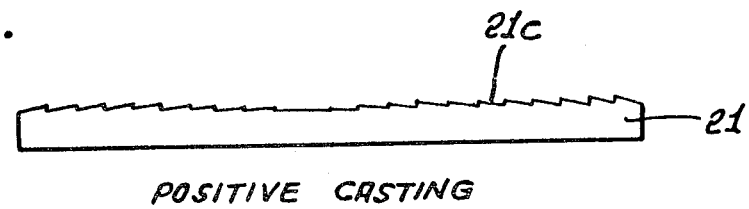
FIG. 6. POSITIVE CASTING
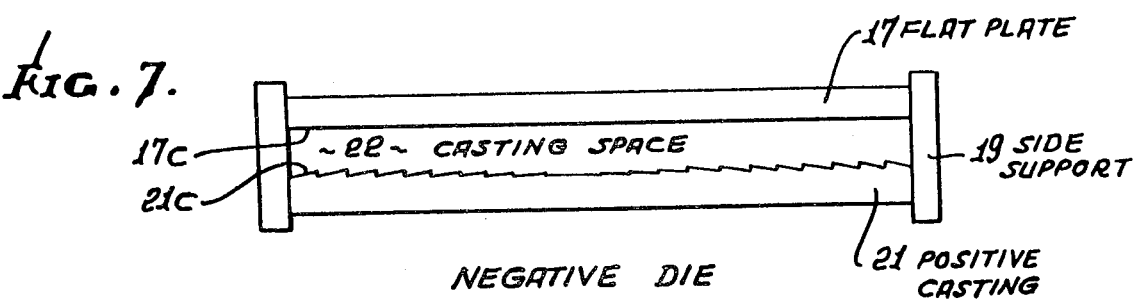
FIG. 7. NEGATIVE DIE
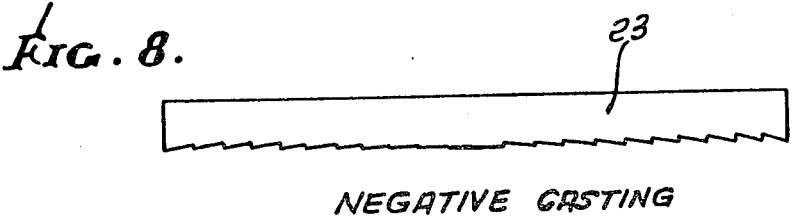
FIG. 8. NEGATIVE CASTING
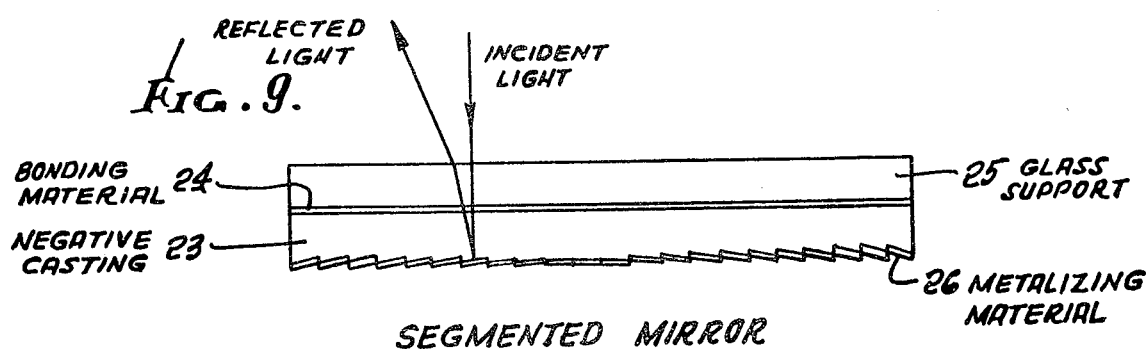
FIG. 9. SEGMENTED MIRROR

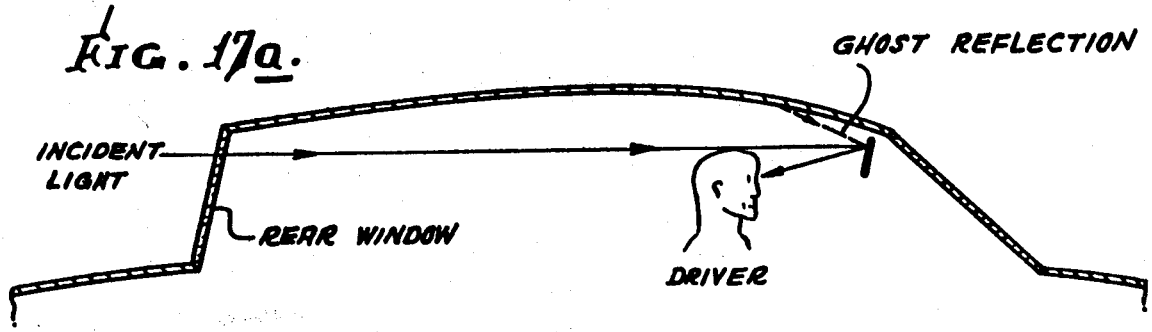
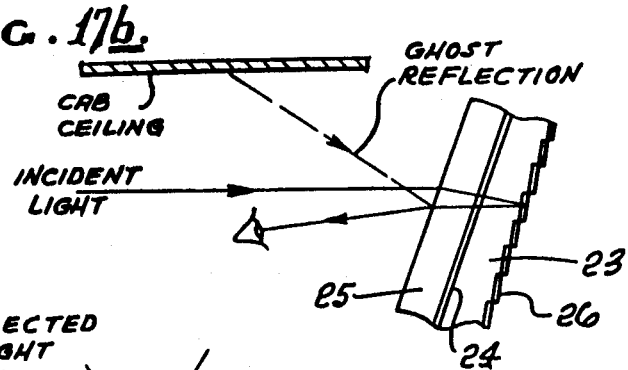
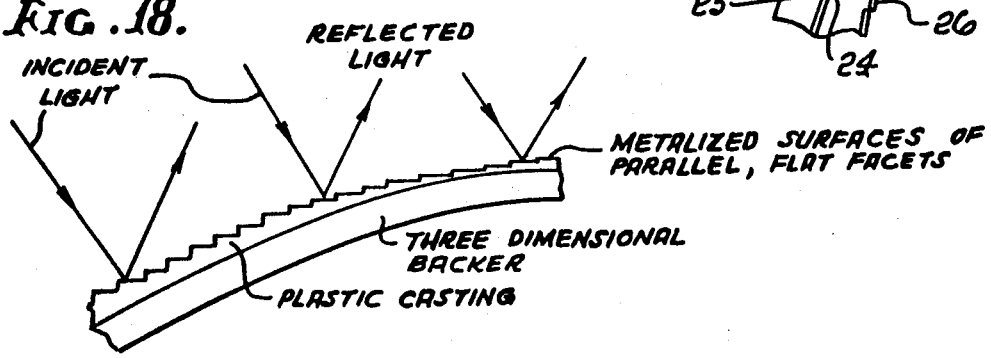
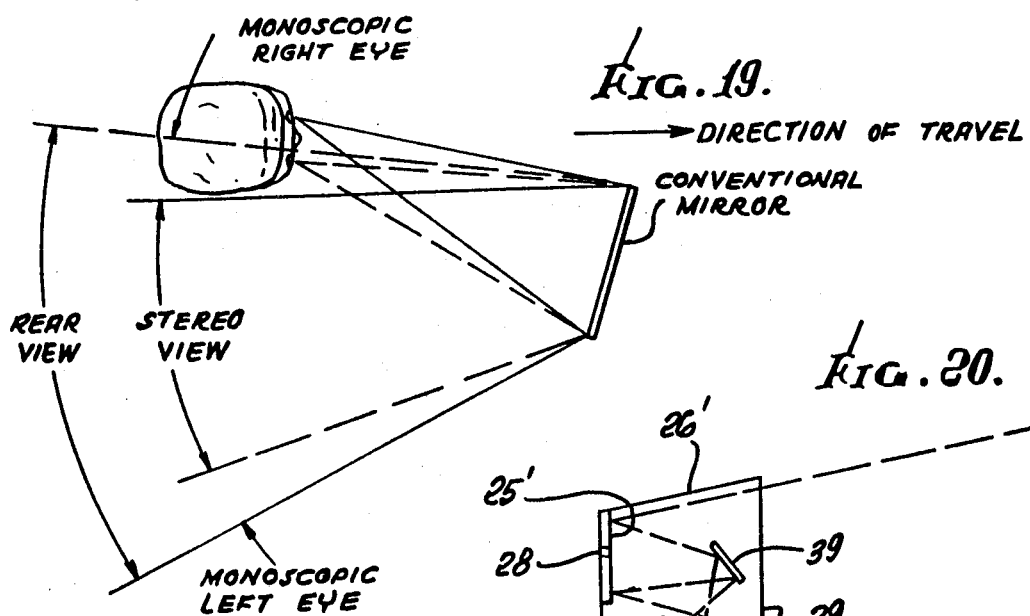
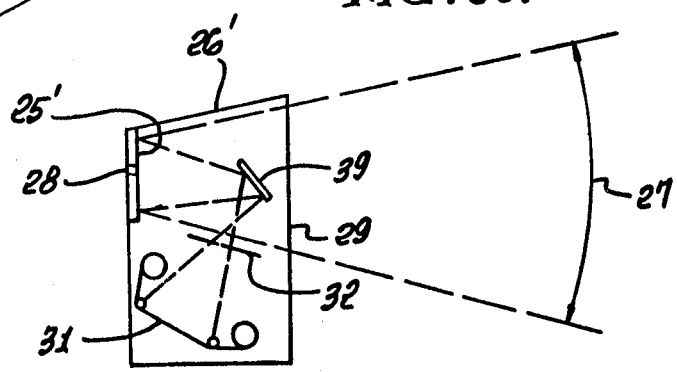

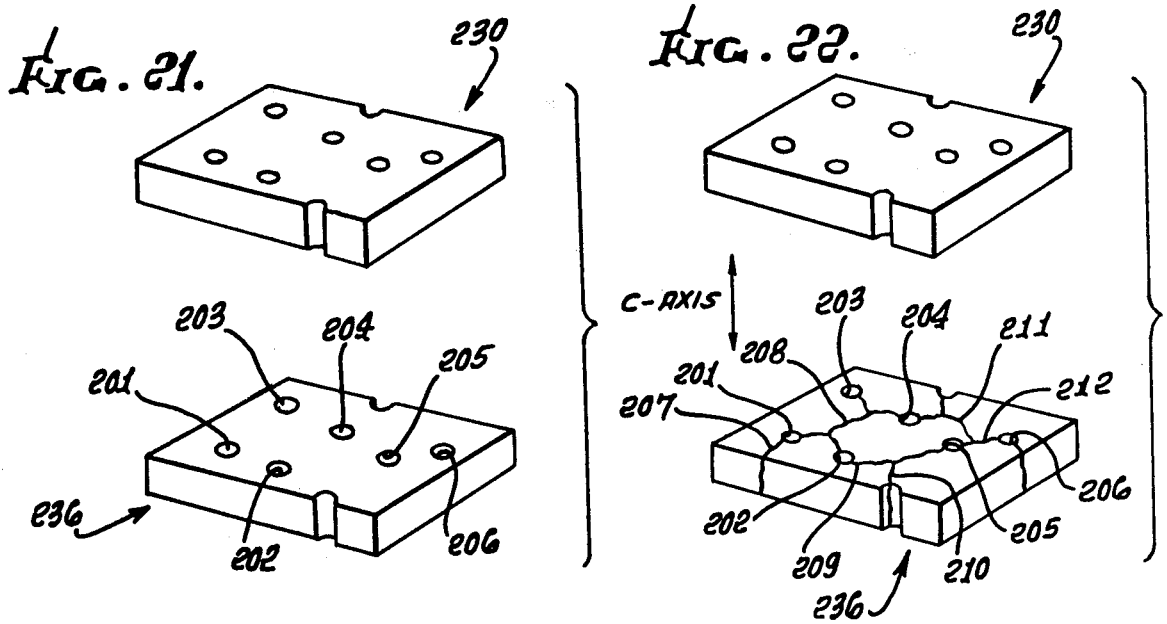
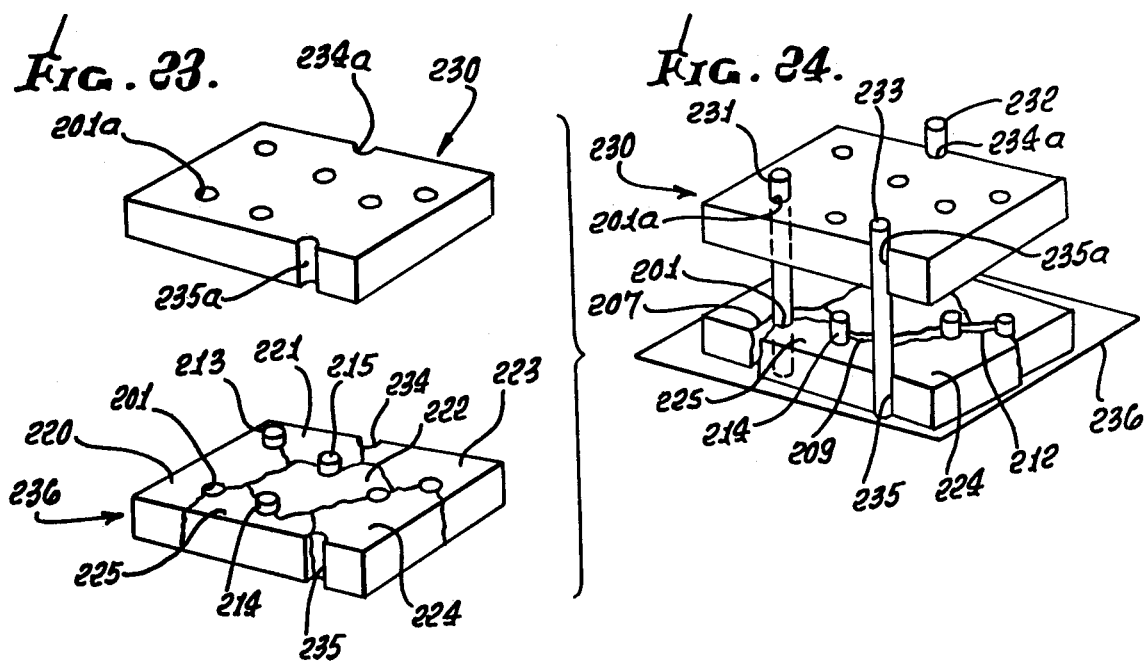
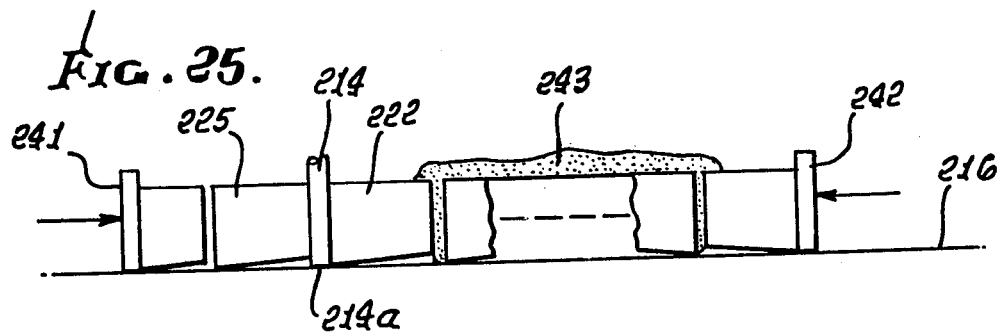

SEGMENTED MIRROR

This is a division of application Ser. No. 233,106, filed Feb. 10, 1981, now U.S. Pat. No. 4,368,951 which was a continutation-in-part of Ser. No. 109,970 filed Jan. 7, 1980, now abandoned.

BACKGROUND OF THE INVENTION

This invention relates generally to mirrors comprising a myriad of reflecting surfaces so aligned with respect to each other as to produce one virtual image, which may be plain or focused. More particularly, it concerns mirrors of the type wherein the surfaces are irregular in outline to minimize or prevent glint patterns. Furthermore it relates to lenses comprising a myriad of lense surfaces so aligned with respect to each other as to produce one focused image.

This invention may be used in the construction of rear view mirrors (for automobiles) which afford a 160° or 190° angle of rear and flank view from a mirror bracket only somewhat wider than a conventional rear-view mirror. This mirror will afford an undistorted image through the rear window, and smaller virtual images from the left and right flanks and sides of the vehicle. The wider 190° angle of rear view is achieved by using two glass plates as mounts (instead of one), joined in the center with chevron-shaped horizontal cross section, and placed in one bracket.

Most existing mirrors are continuous reflecting surfaces which may be two-dimensional planear surfaces or three-dimensional curved surfaces (convex, concave or other). Conventional three-dimensional shaped mirrors are bulkier than planar mirrors by virtue of the additional material needed to provide the third-dimension of the mirror surface. Commercially produced three-dimensional mirrors often have relatively large aberrations with attendant distortion of the images reflected therefrom. Reducing such distortions would significantly increase the cost of such mirrors.

In the past, mirrors have been proposed wherein multiple reflecting surfaces, offset from one another, have regular form, as in U.S. Pat. No. 3,739,455 to Alvarez. Due to such repetition of regular outlines of the reflecting surfaces, linear glint patterns may be discerned by the viewer. As a result, that type mirror is not well suited to the special mirror shapes, and uses disclosed herein, as for example rear view mirrors for vehicles enabling panoramic viewing of one or both rear flanks of the vehicle as well as toward the rear thereof, and other devices.

SUMMARY OF THE INVENTION

It is a major object of the invention to provide a mirror construction, and a method of making same, the mirror being especially suited for rear view use in a vehicle, the basic construction comprising:
 (a) a support, and
 (b) a myriad of irregularly outlined, contiguous mirror surfaces carried by the support, certain of such surfaces dimensionally offset from one another, in a common direction which may be parallel or subparallel to the incident radiation to be reflected, so oriented with respect to one another such that the collective reflected image from all mirror facets is essentially equivalent to the reflection from a continuous mirror surfaces.

The myriad of contiguous mirror surfaces may be on the side of the support on which the radiation first impinges, or, if the support is transparent, such as a piece of glass, the metalized surfaces may be on the reverse side of the glass, so that incident light first penetrates the glass before being reflected, as is the case in most conventional mirrors.

It is another object of the invention to provide a mirror of this type containing two or more groups of contiguous reflecting surfaces within the outline of one mirror frame. Within this frame each group of radiation reflecting surfaces may face directionally differently. Thus, an observer can see two or more views by consulting one mirror frame. The groups of surfaces may occupy adjacent areas, or they may be interspersed as will be seen, and a rear-view mirror may incorporate same.

It is a further object of this invention to provide a design for mass producing mirrors, which, if fashioned or manufactured using existing techniques would be impractical or too costly. It is also an object of this invention to provide a process for commercial manufacture of such mirrors.

Another object of this invention is to enable the shape and/or orientation of the rigid unit supporting and/or containing the myriad of mirrored surfaces to be other than perpendicular to the mirrored surfaces. For example, the generalized shape of the surface comprising the myriad of reflecting planar facets may be three dimensional, whereas if the perpendiculars to each facet are all parallel, the gross effect of reflections from the facets taken together is essentially the same as the reflection from a planar mirror, providing the angle of incidence is within a few degrees (of angle) of being parallel to the perpendiculars to each planar facet. (See FIG. 18).

An additional object of the invention is to enable the construction of a partially transparent mirror, combining mirror segments from one or more mirror surfaces with a set of transparent, non-silvered segments which allow an effective view through the "mirror" area. If a set of parallel non-silvered, flat surfaces are interspersed with a set (or sets) of silvered or reflecting surfaces, these transparent areas will allow a filtered view through the mirror area if the material of the rigid mirror is clear, such as glass, and if the viewer is on the dark side of the mirror.

Another object of the invention is to enable the combination within one mirror frame of an area comprising a conventional flat mirror with one or more areas of segmented mirrors within one flat structurally rigid stable support. (See FIGS. 12 and 13).

Another object of the invention is to combine two or more flat stable supports, each containing flat and/or segmented mirrors, into one structurally rigid unit within one frame, or bracket (see FIG. 16b).

Another object of the invention is to diminish glint from the edges of contiguous mirror segments by metalizing only the surfaces of the segments, and not their edges. Furthermore, the edges of the mirror segments may be treated to minimize glint by reducing the reflectance of the surface immediately adjacent to its edge, and of the nearly-perpendicular area of offset between contiguous mirror segments.

Another objective of the invention is to be able to adjust the reflectivity of a segmented vehicular rear view mirror so as to make the image less intense for night viewing. This may be accomplished in several ways: by mechanically introducing a filter between the driver and the glass support carrying the mirror surfaces; by mechanically separating the metalizing layer from the reflecting surfaces, thereby reducing the reflection coefficient of the mirror; or by mechanically adjusting the attitude of the glass support frame at night such that the flat front surface acts as a conventional flat mirror with relatively poor reflectance.

Another objective of the invention it to utilize a method of manufacture of the master die for casting the plastic strip containing the offset segments of mirror, which insures very accurate orientation of the mirror segments, such that the reflected view appears continuous to a viewer despite the fact that the mirror is segmented. This accurate orientation of mirror segments is achieved by maintaining only one cutting direction with respect to the master mold during segmentation thereof. Each segment cut from the master mold, when moved to conform to the desired surface shape (usually flat), is constrained by the sides of the adjacent segments to move without rotation in the same direction as the cutting direction.

Another object of this invention is to manufacture an optical lense for focusing transmitted radiation by utilizing the principals of the preceding paragraphs but affixing the plastic strip containing offset segments of a lense to a flat, transparent backer such as glass.

Yet another object is to provide a method of guiding the irregularly outlined surfaces of a mold during their translation so as to prevent lateral displacement of the mold surfaces, this technique being employed to maintain original orientation of each segment of the cast surface of the mirror. Also, image overlapping around the peripheries of adjacent individual surfaces is prevented.

These and other objects and advantages of the invention, as well as the details of illustrative embodiments, will be more fully understood from the following description and drawings, in which:

DRAWING DESCRIPTION

FIGS. 1 through 9 show the sequence of steps for making a segmented mirror, and are separately described as follows:

FIG. 1 is a vertical section through a flat-lying convex glass mirror;

FIG. 2 is a vertical section through a plastic negative casting on the FIG. 1 mold;

FIG. 3 is a vertical section showing laser beam cutting of the negative casting into segments, the source of the laser beam being perpendicular to a flat plate;

FIG. 4 is a section showing translation of the FIG. 3 segments to contact a flat glass surface;

FIG. 5 is a section through a die that includes the FIG. 4 segments (immobilized) opposite a flat surface;

FIG. 6 is a positive casting from the FIG. 5 die;

FIG. 7 is a section through a negative die, constructed by using a positive casting from the FIG. 6 die;

FIG. 8 shows the transparent negative plastic casting resulting from the die in FIG. 7;

FIG. 9 shows the casting of FIG. 8 transparently bonded to a transparent glass plate, with metalized surfaces; i.e., a complete segmented mirror which reflects similarly to a convex mirror. (Actually the angle between incident and reflected light is somewhat larger in FIG. 9 than in FIG. 1 because of the refraction at the front surfaces of the glass backer).

In FIGS. 10, 11, 12 and 13 each diagram of the plan view of segments of castings is the same, because the same pattern of cuts is used each time in the segmentation process. This makes possible the substitution of segments to create one collage of two or more groups of segments. The collage of segments is then used as in FIG. 4.

Figure 4:
Figure 10:
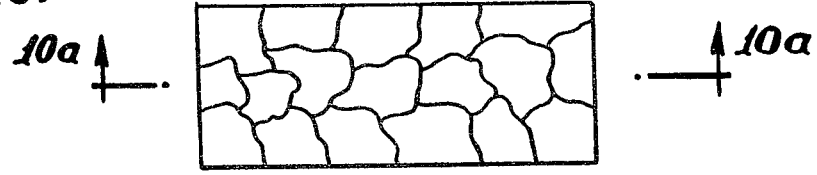
Figure 10A:
Figure 11:
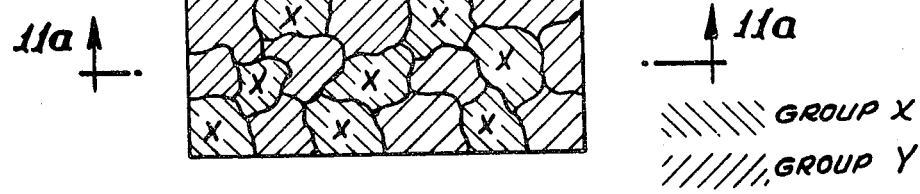
Figure 11A:
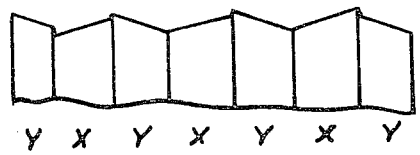
Figure 12:
Figure 12A:
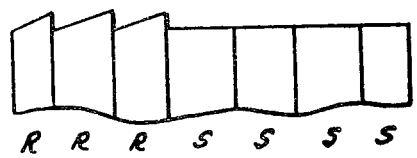
Figure 13:
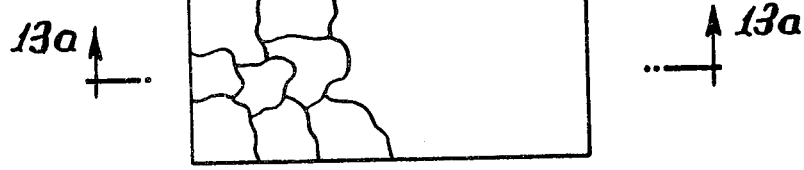
Figure 13A:
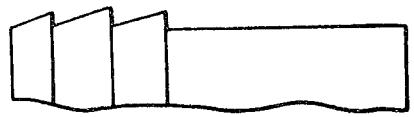
Figure 14:
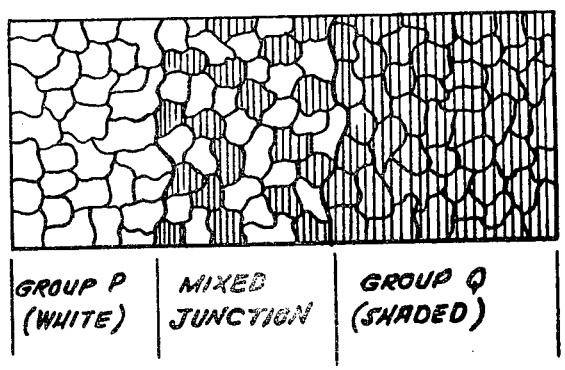
Figure 15A:
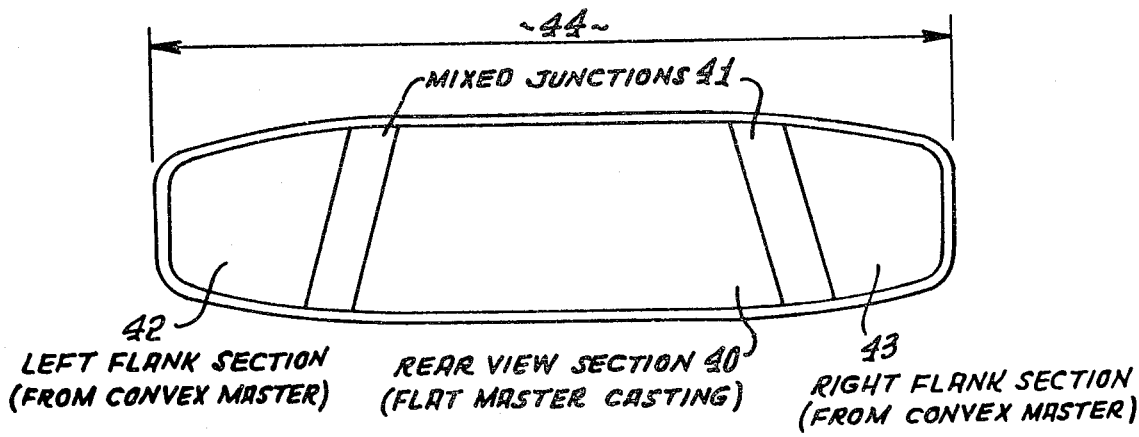
Figure 15B:
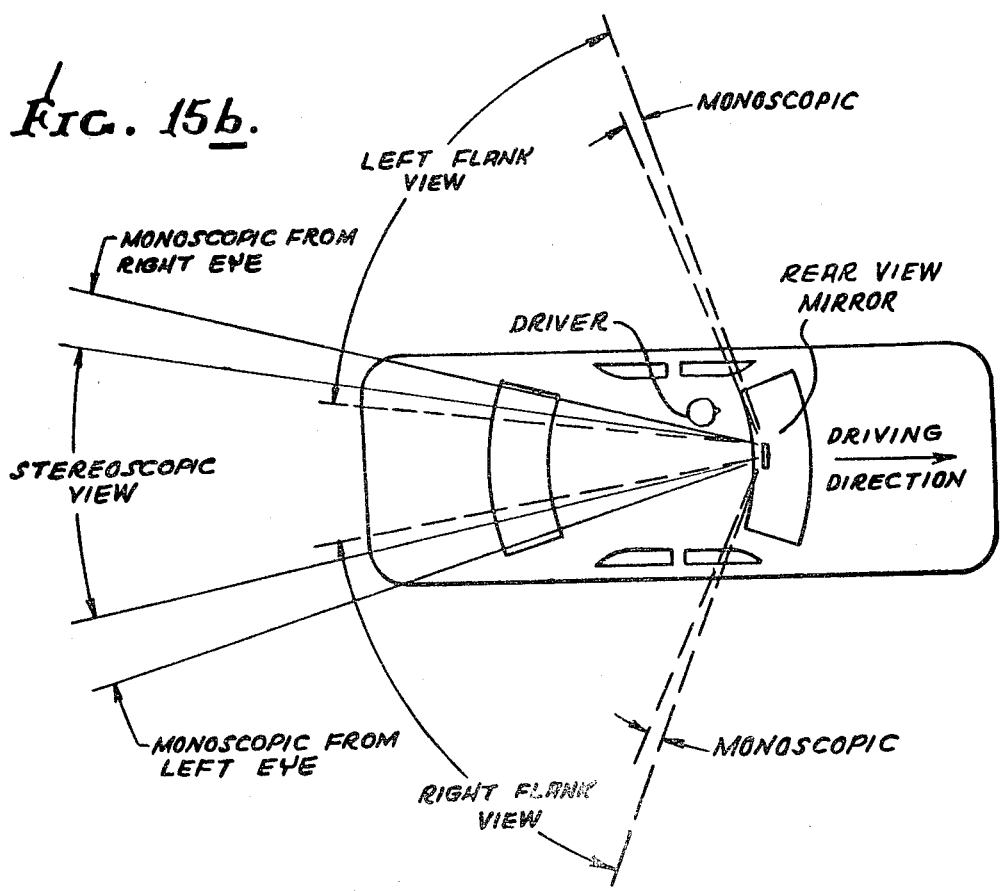
Figure 16A:
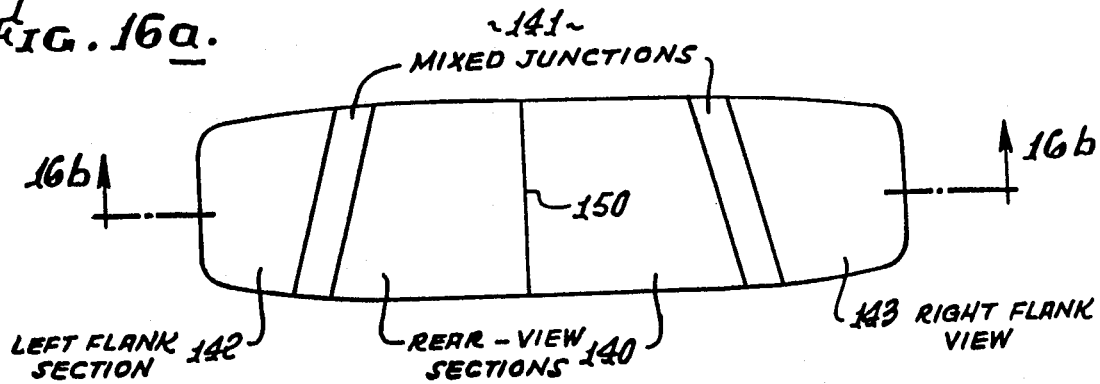
Figure 16B:
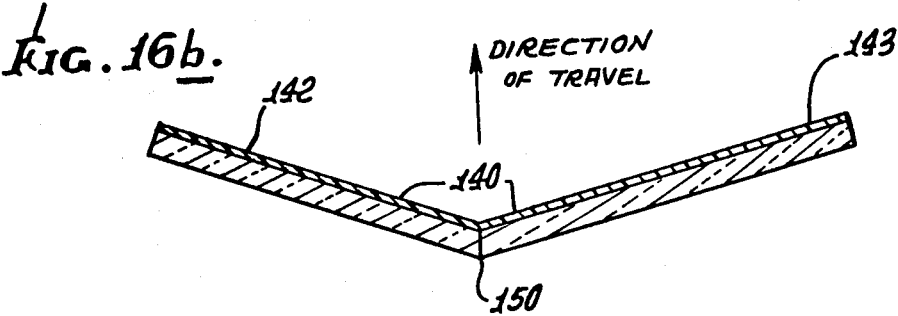
Figure 16C:
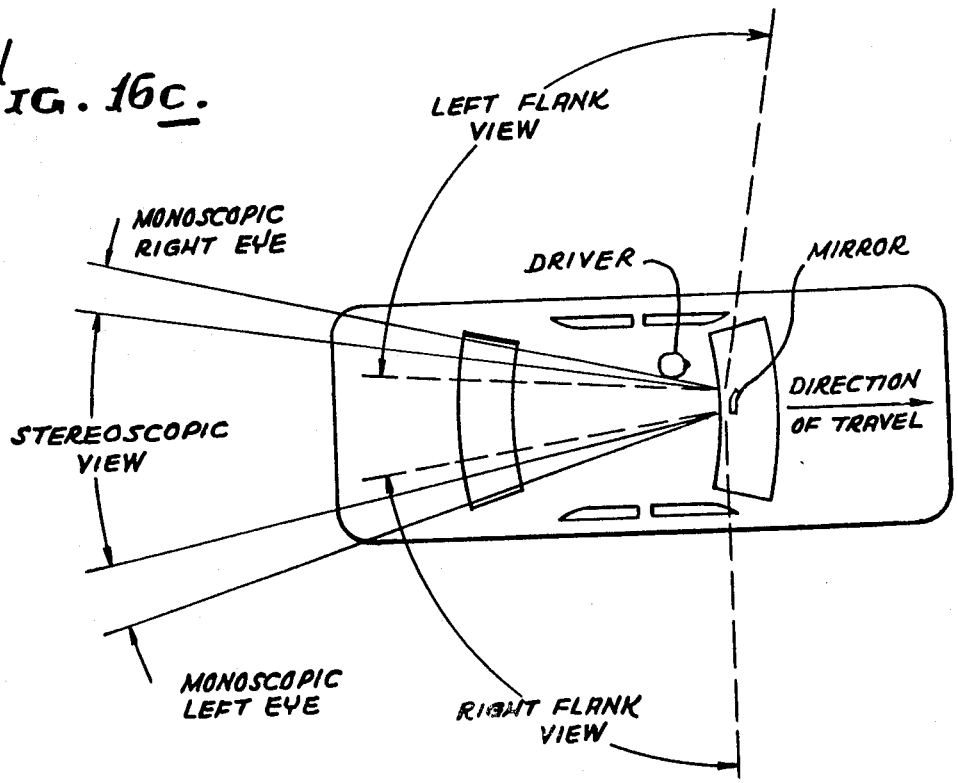

FIG. 10 is a close-up plan view of segments of casting (perpendicular to C-axis);

FIG. 10a is a close-up cross section of displaced facets of segments of negative casting (c.f. FIG. 4);

FIG. 11 is a close-up plan view of segments of castings from two groups of reflection surfaces;

FIG. 11a is close-up cross section of the facets of segments of castings. Slopes to the left are the X group, and to the right are the Y groups;

FIG. 12 is a close-up plan view of the facets of segments of castings of R and S groups; S group is cast from a flat plate;

FIG. 12a is a close-up cross section of the facets of segments of castings. The R group on the left is in juxtaposition with the S group on the right;

FIG. 13 is a close-up plan view of facets of segments of castings on the left in juxtaposition with a casting from a flat plate, trimmed to fit;

FIG. 13a is a close-up of cross section of the facets of the segments of castings on the left, and a cross section of a casting from a flat plate on the right;

FIG. 14 shows a mixed junction between two groups of segments of castings;

FIG. 15a shows one configuration of a segmented rear view mirror, and FIG. 15b shows in plan the resulting 160° azimuth of rear and flank views;

FIG. 16a shows a driver's view of a mirror comprising two supporting glass plates, rigidly connected;

FIG. 16b is a horizontal cross section of the mirror in FIG. 16a;

FIG. 16c shows in plan the 190° azimuth of rear and side views afforded by using the mirror pictured in FIGS. 16a and 16b;

FIG. 17a is an elevation showing the advantage of tilting the orientation of the support glass, such that the "ghost" reflection from the front of the support glass is from a poorly illuminated area, such as the ceiling of the driver's cab, thereby making it virtually invisible to the driver;

FIG. 17b is a fragmentary section through the FIG. 17a mirror;

FIG. 18 shows a segmented mirror on a three dimensional support, which acts as a flat mirror, and shows the versitility of this invention whereby the shape of the support is independent of the shape of the master mirror from which the segments were derived;

FIG. 19 is a plan view diagram of a conventional rear view from a mirror;

FIG. 20 shows a schematic view of a camera incorporating the invention;

FIGS. 21-24 are perspective showings of steps to insure accurate lateral displacement of irregularly outlined mold surfaces during their longitudinal translation into positions enabling casting of a mirror media; and FIG. 25 is a side elevation showing details of guiding and peripheral constriction of irregularly outlined mold surfaces.

DETAILED DESCRIPTION

Construction of such segmented mirror surfaces is best achieved by forming them from a plastic material, utilizing a die. The plastic material may provide the necessary rigidity, or it may be cast into a thin layer (flat on one side and the segmented surfaces on the other). The flat side of the thin layer is then adhered to a dimensionally stable flat material such as glass. The metalized reflecting surface may be either the air-reflector interface on which the incident light first impinges, or, if all materials are sufficiently transparent, the impinging light may travel through these materials and be reflected by a mirroring material on the "back" side. The latter generally would be preferable to protect the metalized surface, and to facilitate cleaning of the exposed surface.

Figure 1:
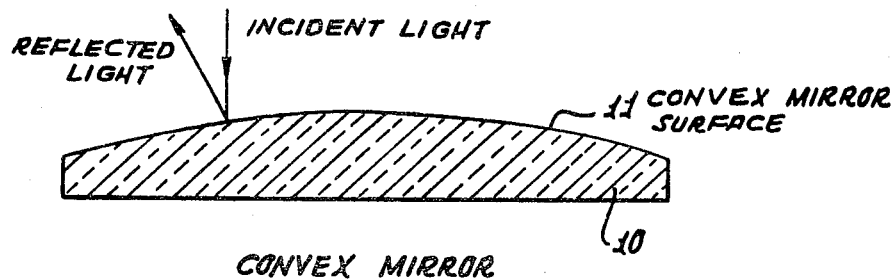
Figure 2:
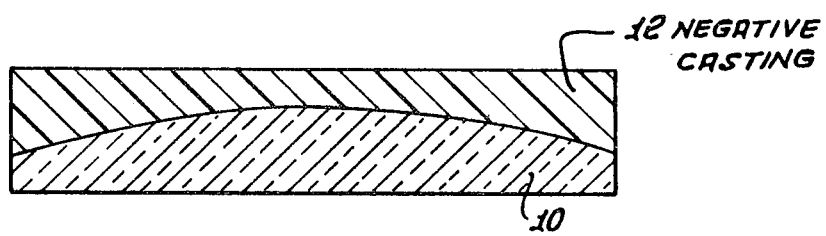
Figure 3:
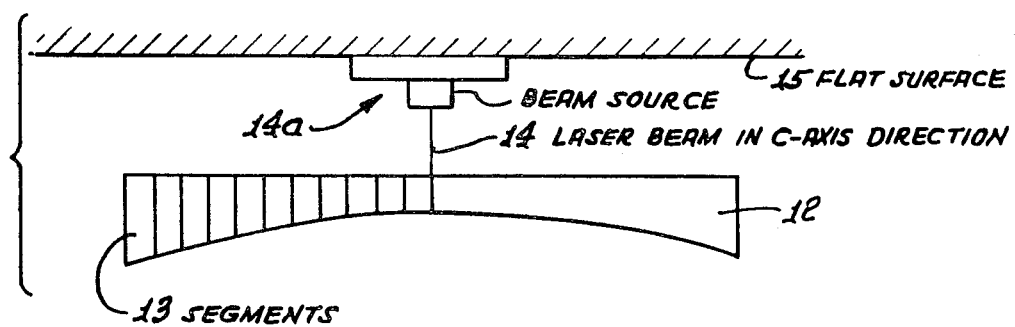

In order to construct a die as seen in FIG. 7, a model as at 10 in FIG. 1 with a continuous surface 11 is constructed in the shaped of the desired reflector. Glass, plastic or some other suitable material may be used for this model, from which a negative copy 12 is molded as in FIG. 2 in some suitable material, such as an opaque thermoplastic. This negative casting 12 is then cut into segments 13 of irregular outline in such a manner that the orientation of the cutting direction (C-axis) is constant and always the same with respect to the negative casting. This common direction, as for example vertical, should be approximately the average direction of perpendiculars to the resulting mirror segments. One convenient manner of cutting the casting is with a laser beam 14, the laser 14a held in a jig which keeps the beam perpendicular to flat surface 15. See FIG. 3.

After the negative casting if cut into segments, for which perpendicular cross sections are preferably irregular in outline, the segments 13 are translated short distances relative to one another, in the same C-axis direction which is common to all the cut surfaces. The distance of translation would be such that the surfaces of individual segments 13 of the negative casing each touch the surface to which it is desired that they conform, such as the flat surface 15.

It is essential that the segments of the casting are not rotated around any axis. Their only movement is translation in the direction of the C-axis, and each segment must retain its same contiguous neighbor segments before and after translation. As long as any segment cut from the negative casting is not circular or ring-shaped in any cross section perpendicular to the C-axis, and as long as the segments are kept in contact, translation without rotation of the segments is easily and accurately accomplished because the elongate segments have only one degree of freedoms of movement with respect to one another, i.e. translation along the C-axis.

Figure 5:
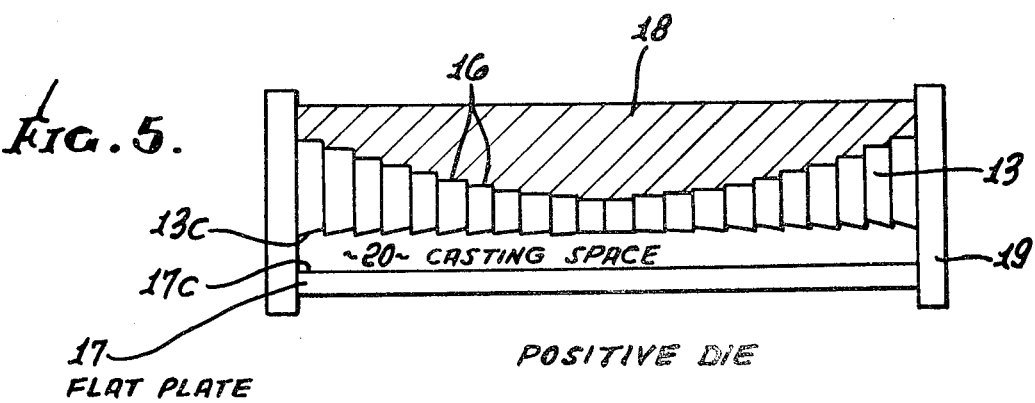

The segments are then immobilized with respect to one another, as for example by bonding the segments 13 with backing material 18, at bend locations 16, and the resulting stabilized mosaic of displaced segments of the original reflecting surface may be used to make a positive die FIG. 5 (and subsequently a negative die FIG. 7) for manufacturing replicas of that mosaic surface. Only the displaced facets of the original reflecting surface are to be made reflective (i.e. metalized) on the replica mosaic surface.

The replicas of the small portions of the cut surface exposed in the mosaic (nearly at right angles to the reflecting surfaces) may be left "optically rough" and may not be metalized.

A further reduction in glint may be effected by not metalizing the periphery of each facet, thereby reducing distracting optical effects caused by the interaction of adjoining facets and the replicas of the cut faces separating them, and also reducing effects of any imperfections in the castings of the reflecting surfaces, which imperfections would tend to be concentrated in these peripheral areas.

FIGS. 5 and 7 show a die formed from the FIGS. 4 and 6 structure, and includes side supports 19 and a flat cover plate 17. Casting spaces 20 and 22 are thereby formed between plates 17 and surfaces 13c and 21c of mosaics 13 and 21, respectively. FIG. 6 shows a casting 21 made by introduction of plastic into space 20 of FIG. 5, and having corresponding mosaic surface 21c which is a negative image of the surface 13c formed in FIG. 4. The casting 23 may for example consist of transparent plastic material, such as polystyrene or other material. Referring to FIG. 9, the casting may be supported on a glass backer 25, and the mosaic surface will be selectively metallized at 26, i.e. only surfaces (corresponding to original segments) of a first group or selected groups will be metalized. The outlines of the segments should be irregular and without parallel straight line segments to obviate the formation of discernible glint patterns. See FIG. 14 in this regard.

Vehicle Mirror for Rear and Side Views

Conventional rear view flat mirrors afford the driver of a motor vehicle a reflected view of a limited azimuth, restricted by the dimensions of the mirror, of the rear window, and distance of the mirror from the viewer. Such mirrors leave "blind spots" on both rear flanks, which the driver cannot see. This is the cause of traffic accidents when the driver does not properly monitor and take into account the presence of nearby vehicles. Convex mirrors are sometimes used to provide a wider angle of reflected rear view vision, but these mirrors produce small virtual images, and the resolution of the reflected view out the rear window is much inferior to that of the conventional flat mirror. Furthermore, the driver has difficulty in judging distances to objects in the small virtual image. Therefore, drivers sometimes use a convex mirror or mirrors for flank view(s) as well as a conventional flat mirror, thus causing the driver to consult two or more mirror brackets to appraise what is happening near the rear and flanks of his vehicle.

By using the principles of the segmented mirror, as described herein, a new type of mirror is provided which will afford an undistorted "flat" reflected image through the rear window as well as small-scale, "condensed" virtual images of both rear flanks of the vehicle, all within one rigid structural unit not much larger than that used for a conventional rear view mirror.

One problem for a driver attempting to alternate his attention between two or more mirrors (a flat mirror and convex mirror(s)) is that he must take the time and conscious effort to redirect the azimuth of his visual attention and he must change the distance at which his eyes are focussed. The focus of his eyes is distant for the flat mirror and closerange for the convex mirror(s). As a person becomes older, this becomes more of a problem for many drivers because visual redirection and refocussing takes more time and increased effort. By having all the mirror surfaces within one frame, as enabled by the invention, the driver may glance to the rear view without having to change substantially the distance of focus of his eyes from that which he uses for looking forward through the windshield at the road ahead, while at the same time his peripheral vision can quickly evaluate whether a vehicle is threateningly near either flank of his vehicle. This quick evaluation, without having to refocus to the closer virtual images flanking the undistorted view out of the rear window, is possible because the flanking image of a nearby vehicle moving in the same direction will appear as nearly "stationary" whereas the more-distant middleground will appear to be "flying-by" because of the relatively rapid angular velocity of stationary objects, when viewed by the driver of a moving vehicle via the mirror. This "stationary" look vs. a "flying-by" impression is readily perceived by the peripheral vision and therefore the presence of a nearby vehicle off the flank of the driver's vehicle is easily noted by the driver.

The stereoscopic image one observes with both eyes in a conventional rear view mirror is augmented by monoscopic continuations of the image on either side. The left eye extends the reflected image of distant objects monoscopically to the right by an amount measured horizontally in the plane of the mirror almost as great as the distance between the pupils of the eyes of the observer. Conversely, the same effect occurs with the right eye. The mind combines the central stereoscopic image with the two adjoining monoscopic images into the mental image, comprising the rear view. The observer usually does not realize where the stereo portion of the image terminates, i.e. it all registers as one image to the observer. See FIG. 19 in this regard.

Optimum Design—Rear View Mirror

One optimum design of segmented rear view mirror, to be located inside the vehicle near the center of the windshield will include a central area derived from a planar surface, and two areas (left and right) for viewing the left and right rear flank views. The width of the entire composite mirror is typically about 25 centimeters, and the height about 5.5 centimeters, similar to the dimensions of many conventional planar rear view mirrors. The rear flank views should be derived according to the methods of this invention from areas of master mirrors shaped somewhat like sections from vertically standing barrels. The "barrel shape" should be sufficiently convex along a vertical plane such that the reflected view out the side windows will subtend the entire height of those windows. The cylindrical curvature should be such that the width of each mirror area is about 6 or 8 centimeters for a horizontal azimuth of vision of 60 to 70 degrees.

In order to minimize the width of this mirror, to facilitate the driver's peripheral awareness of the flank views, and to provide a maximum angle of view for each of the three views (rear and both flanks) visible from the composite mirror, mixed junctions as previously described (see FIG. 14) perhaps about 1.5 cm. wide, join the central area 40 with the flanking areas 42 and 43 of this rear view mirror. The mixed junctions 41 may be slanted, as shown in FIG. 15a, to enhance the driver's perception of the last glimpse of a passing vehicle, visible through the lower corner of the rear window in many automobiles.

Another optimum design of a rear view mirror made according to this invention affords an azimuth of view of 190°, more or less. This is accomplished by joining two glass backers, such that they form a chevron-shape in horizontal cross section, with the peak 150 pointed toward the driver, as can be seen in FIGS. 16a, 16b and 16c. When the rear view sections 140 are accurately positioned and immobilized with respect to one another (FIG. 16a), then the user's mind will perceive an unbroken stereoscopic rear view, and the line 150 marking the joining of the two backers will be virtually unnoticed by the driver. The mixed junction 141 correspond to those at 41 in FIG. 15a, and flank sections 142 and 43 correspond to those at 42 and 43 in FIG. 15a.

In the case of a mirror with one glass backer, one would expect that the mirror sector for the view of the left flank should subtend a flanking view somewhat wider than for the right flank, as necessitated by the geometry of the orientation of a conventional rear view mirror to the driver. However, using the principals of mirror-segmentation embodied in this invention, the frame of the composite mirror may be oriented to extend the angle of reflected vision more to the right flank (while commensurately reducing the angle of left flank vision). This has the advantage of minimizing any gap in vision between the junction of the forward peripheral vision and the reflected vision of each flank. See FIG. 15b in this regard.

In some cases and as referred to above, it may prove advantageous to make these junctures mixed rather than abrupt. Mixed junctures in the resultant composite mirror are made by mixing reflecting facets from adjoining families of mirror sectors such that within the zone of mixed juncture both adjoining mirror families will be represented. The concentration or areal density of the number of rear view reflecting sectors of one family may grade from 100% at the edge of that mirror area to 0% at the other edge of the mixed juncture. Concurrently the percentage of sectors resulting from the other "master" mirror would increase from 0 to 100% across the zone of mixed juncture. Or the percentage or representatives of each group throughout the zone or mixed juncture may be constant. See in this regard FIG. 14 with reflecting areas of sets P and Q corresponding to mirror areas 40 and 42, or 40 and 43 in FIG. 15a, and the mixed juncture zone (P and Q) corresponding to mirror area 41.

The mixing of groups of facets within the zone of mixed juncture is accomplished by substitution of appropriate coincident segments of the identically shaped patterns of negative castings of adjoining groups of segments (with common C-axis for all segments). From the resultant collage a single die is made for the entire composite mirror within the bracket.

The advantage of a mixed juncture (as in FIG. 14) in this case is that in the zone of juncture within the area of the composite mirror, images from both the centrally-located flat mirror as well as from the convex mirrors on the left and right sides will be perceived by the driver. The image perceived by the driver of an overtaking automobile will be a "nearly stationary" shape blending from a view seen towards the edge of the rear window to a smaller "nearly stationary" view out the flank window (surrounded by the blurred rush of the background). The mixed juncture will assist the driver's mind to integrate the two views and recognize the continuity of movement of the overtaking auto as it moves from behind to alongside the flank of the driver's vehicle, until the driver's peripheral vision directly "picks up" the overtaking auto by direct view out the side window. Using mixed junctures enables the design of a composite mirror which will take up less horizontal width, thereby affording a more unrestricted view by the driver forwards through the windshield, and enabling easier mental assimilation and recognition of continuity of movement of nearby traffic off both flanks of the vehicle. This is possible because the concurrent views observed by the driver from both flanks are closer together and therefor easier for the mind to perceive by direct and peripheral observation with minimum shifting or refocussing of the driver's eyes.

However, for the purpose of this invention, the juncture zones between the undistorted central portion of the composite mirror and the originally convex flank mirrors may be either smoothly transitional (continuous curvature of one "master" mirror surface, flat in the center and convexly shaped at both ends), abrupt (sudden change from one master mirror surface to another), mixed (as described above), or a combination of these. Each flanking mirror may be junctured so as to minimize the views of the corner posts and driver, in which case the composite mirror might have several n families of reflecting facets with n−1 juncture zones.

CONSTRUCTION OF THE MIRROR

The first step in constructing the mirror, an example of which is seen in FIG. 15a is to determine the angular subtendance of rear and side windows from the vantage point of the intended location of the mirror inside the vehicle near the upper central area of the windshield. The central portion 40 of the subject mirror is sized and oriented to afford a complete undistorted view through the rear window. For the left and right flanks, suitable convex mirrors 42 and 43 are designed. These designs should accommodate the transition from reflected views through rear and flanking windows, so the driver easily may "follow" the movement of nearby vehicles traveling in the driver's direction of traffic as they pass from view through rear window to rear flanking windows (or vise versa. The curvatures of the side mirrors 42 and 43 may be designed to make the transition gradual from the undistorted central reflecting area 40 to the convex flank reflectors. Each side mirror may be designed with any convex curvature, including spherical or cylindrical curvature, but more likely a complex convex curvature fashioned to increase the usefullness of the resultant view out the flanking windows.

In order to minimize the width of the "bracket", 44 of the three or more groups of mirror facets, so as to minimize obstruction to the driver's view forward and to facilitate peripheral perception by the driver, the composite mirror system is designed so that the advantages of each of the views are optimized with minimum interference and maximum accommodation to each other. The optimum relative locations of each of the original overlapping "master" mirrors are determined. Castings are made of each mirror and the castings segmented, in accordance with the principals of this invention with a constant C-axis direction of segmentation common to all "master" mirrors. This C-axis direction must be a constant direction which may be essentially parallel to the line between the point midway between the eyes of an average driver seated in the vehicle, and the central point of the flat mirror (affording a view through the rear window). The pattern of segmentation intended for the finished segmented mirror must be used for segmenting each of the adjoining master castings. Each such adjoining casting of a master mirror must be properly located and oriented with respect to the others such that in the zone of overlap between the sets of segments from adjoining master castings shares identical segments, enabling selection of a boundary, between the two sets of segments with a snug fit between the adjoining sets of segments.

A jig, affixed on the interior of the cab of the vehicle near the intended location of the composite mirror, may be used to capture the optimum location and relative orientation of each of the (overlapping) "master" mirrors with respect to each other, as well as to the direction of the optimum C-axis, the common segmentation direction for casting from all three "master" mirrors. The settings for the holder of each "master" mirror are then used to orient and locate the casting of each "master" mirror with respect to the C-axis direction of segmentation. The pattern of movement to which the cutter is confined, i.e. one templet or pattern located perpendicular to the C-axis, covers the entire field of the intended composite mirror, such that the overlapping portions of adjacent areas are segmented in identical patterns. The pattern of segmentation must be common to portions of overlap of adjoining "master" mirrors, so that the optimum locations and natures of these junctures may be chosen.

Second Example—Camera Utilizing Segmented Mirrors

Another utilization of cast segmented-mirrors constructed in the same manner as in the previous example is in a camera where the image on the film is created by light reflected from a segmented mirror. In FIG. 20, the segmented mirror 25' is contained with camera housing 26' to receive light via glass plate 29 and over a field of view designated at 27. A peep hole for sighting appears at 28. Mirror 39 reflects light from the mirror 25' to film 31, via shutter and diaphragm indicated at 32. In one camera, more than one segmented mirror, each with differing focal lengths, may be used by providing a system for exchanging mirrors.

To minimize aberrations, light is preferably reflected directly from metallized concave segmented mirror sectors rather than traveling through the casting and support plate first. In order to keep the mirror surface clean, the internal portion of the camera is sealed and light will be admitted through the protective glass plate. Light reflected from the main segmented mirror is reflected by a flat metallized mirror surface at 29 set at an angle to the axis of the main mirror and located near the focal point of the main mirror, such that the image will be focussed on a conveniently oriented focal plane outside the path of the incoming light.

Several adjacent sectors within the area of the main mirror 25' may be designed so as to act as the transparent "peep-hole" suitable for the photographer to target and/or focus the camera. This is achieved by cutting the casting of the special mirror, with the identical pattern of sectors, to that used for cutting a casting of a flat plate, and by substituting a bundle of segments from the flat casting for an identical bundle of segments from the casting of the mirror. The reflecting side of castings from the resulting die are metallized except for the area of flat sectors, which transmit light without any focussing effect to the photographer's eye in back of this "peep-hole" in the mirror.

To construct a lens, using the principals of this invention, a special master lens is used, such as in FIG. 1; however, the design of the master lens must be such that the negative casting 23 in FIG. 8 has one focal point for all lens segments. The negative casting 23 is then adhered to the top surface of a flat glass backer, and/or the positive casting 21 of FIG. 6 is adhered to the bottom surface of a flat glass backer to form the lens.

In the above description, a casting made from a flat or curved mirror-smooth surface is segmented to form a master die or mold. The segmentation is typically accomplished by cutting the casting into pieces using a laser beam or other device, and then the segments are moved parallel to the unique direction of cutting (C-axis), so that the segments all impinge on a surface of the desired shape, usually a flat plane. This process typically involves crowding the segments together so that their parallel surfaces touch. Such touching should insure that the original orientation of a sector of the mirror surface is maintained in the orientation of the corresponding segment. However, if the two sides on the cut are not exactly parallel, when they are pressed together the segments of the casting will not perfectly retain their original orientation, and thus each segment of the cast surface of the mirror will not retain its original orientation vis a vis the other segments. In addition, in the process of being crowded together, adjacent segments (cut from convex surfaces) suffer a relative lateral displacement equal to the width of the cut. The resulting mosaic of surfaces, if metalized, would yield a reflection with very minor overlaps in the image around the periphery of each individual surface.

These aforementioned problems may be eliminated in the manner now to be described. Typically, the method involves blocking lateral displacement of the segments while they are translated longitudinally. For example, three or four cylindrical holes or guide openings such as at 201–206 in FIGS. 21 and 22 are drilled (parallel to the C-axis) at locations spaced around the intended peripheries of the individual surfaces or segments before segmenting the original casting. See cuts 207–212. The diameter of each hole should be approximately twice the width of the cut to be made. After the segmentation is complete, a straight rod or hollow tube or circular cross section equal in diameter to that of the hole is inserted between the two remaining walls of each hole. See for example rods 213–215 in FIG. 23. After segmentation by cutting parallel to the C-axis, the segments of the original casting are then translated parallel to the C-axis so that each segment impinges on the surface of desired shape (usually a flat plane as at 216 in FIG. 24). The movement of each segment is confined to the C-axis direction, and there is no "crowding together" of the segments, because they are held apart by the rods or tubes of diameter the same or almost the same as the diameter of openings 201–206. The rods or tubes should not protrude above the reflecting surface of the mosaic of segments, and as a further precaution against any optical interference with the segmented mirror, the ends of the rods or tubes adjacent the irregularly outlined under-surfaces of the segment (see segments 220–225 in FIG. 23) may either be cut on an angle large enough to insure internal reflection from these surfaces in any mirror constructed using the principals of this invention, or the ends of the rods or tubes may be made optically rough. See rod lower end 214a in FIG. 25, for example.

The described holes are also useful in ensuring accurate setting of the intended angular relationship between the C-axis and the orientation of the surface of desired shape (usually a flat plane), against which each segment of the original casting is made to impinge. This is accomplished by drilling identically located holes in a second rigid sheet or block 230 of material into which a number of rigid guide rods are inserted. See guide rods 231–233 in holes 201, 234 and 235 in molde 236, and extending into holes 201a, 234a and 235a in block 230 in FIG. 24. The lengths of the guide rods extending from the surface of the second sheet or block 230 is such that their ends form a plane of the desired shape and orientation against which the segments are to impinge. First the guide rods 231–233 are inserted into the corresponding holes while rods or tubes 213–215 etc. are inserted in the remaining holes. Then the mosaic of casting-segments are adjusted i.e. translated to the desired plane 216. In this regard, a peripheral constriction typically is applied to the mosaic, immobilizing same, and finally an adhesive material which becomes hard is implaced between the mosaic and the rigid block 230. This forms a rigid block suitable to be surface in a die to be used in accordance with the principals of this invention. See the lateral constriction means 241 and 242 in FIG. 25, the adhesive material 243, in FIG. 25, for example.

From the foregoing, the steps of the method of FIGS. 21–25 include:

(a) cutting irregularly outlined segments of a mold, the segments defining said irregularly outlined surfaces, (b) and longitudinally translating said segments in said common longitudinal direction while blocking lateral displacement of said segments.

In this regard, the step of blocking lateral displacement of the mold segments includes forming longitudinal guide openings in said mold, prior to said cutting step, to intersect the intended peripheries of the irregularly outlined segments of the mold. Further, the blocking step may include inserting longitudinally extending guides into said guide openings, to guide said longitudinal translation of the mold segments. Certain guides (as at 231–233) may be located to block lateral translation of the segments during their translation; and such locating of the guides may include providing a block as at 230 with locating openings therein to receive extensions of the guides.

I claim:

1. In a mirror, the combination comprising
   (a) a support, and
   (b) a myriad of irregularly outlined surfaces carried by the support, certain of said surfaces dimensionally offset from one another in a common direction generally parallel to the incident radiation to be reflected, said surfaces being discrete radiation reflecting surfaces each oriented in such a way that as a group they collectively reflect images of objects toward a viewer's eye location and essentially as if they were a continuous reflecting mirror surfaces, said irregularly outlined surfaces defining successive planes across the mirror surface, and which are progressively increasingly angled relative to a flat plane extending generally parallel to the mirror surface.

2. The combination of claim 1 wherein the support has curvature and/or orientation which differs from the curvature and/or orientation of the continuous reflecting surface referred to in claim 1.

3. The combination of claim 1 wherein a second group of said surfaces, with the same outlines as those in the first group are transparent for passing incident radiation, and are interspersed among the surfaces of the first group.

4. The combination of claim 1 wherein said support consists of molded plastic material.

5. The combination of claim 2 wherein said support consists of molded plastic material.

6. The combination of claim 3 wherein said support consists of molded plastic material.

7. The combination of claim 4 including a dimensionally stable carrier on which said support is carried.

8. The combination of claim 7 wherein said carrier consists of glass.

9. The combination of claim 7 wherein said support and said carrier are light transparent, and radiation reflects from said reflecting surfaces after penetrating the said carrier and said support.

10. The combination of claim 7 wherein said reflecting surfaces are at the side of the support furthest from the carrier.

11. The combination of claim 1 including at least a second group of said surfaces and wherein radiation reflecting surfaces from more than one of said groups are associated in the same holder in such manner that they collectively act as a substantially continuous reflecting surface.

12. The combination of claim 11 wherein two or more groups of surfaces occupy different but adjacent areas.

13. The combination of claim 11 wherein the radiation reflecting surfaces defined by different groups are interspersed relative to the support.

14. The combination of claim 11 wherein surfaces in one or more groups are non-reflecting.

15. The combination of claim 14 wherein the surfaces of one or more groups of non-reflecting surfaces are made transparent.

16. The mirror of claim 1 having a generally V-shaped profile.

17. In a mirror, the combination comprising
(a) a support, and
(b) a myriad of surfaces carried by the support, certain of said surfaces dimensionally offset from one another in a common direction generally parallel to the direction of incident radiation to be reflected, a first group of said surfaces being radiation reflecting surfaces, there being a second group of said radiation reflecting surfaces, the surfaces of the first and second groups being interspersed, the surfaces of each group defining successive planes across the mirror surface associated with the group, said planes being progressively increasingly angled relative to a flat plane extending generally parallel to the mirror surface associated with that group.

18. The combination of claim 17 wherein surfaces of the second group are reflecting surfaces and face directionally differently from the surfaces of the first group so that radiation from two different areas is reflected toward an observer by the first and second group surfaces, respectively.

19. The combination of claim 18 wherein said surfaces and support define a rear-view mirror for use in association with a vehicle, whereby the viewer may view objects at the side as well as at the rear of the vehicle.

20. The combination of claim 17 wherein surfaces of the second group are non-reflecting.

21. The combination of claim 20 wherein the second group surfaces are located on transparent extents of the support.

22. The combination of claim 1 wherein said first group surfaces are angled to reflect light to a viewer's eye zone.

23. A vehicle rear view mirror which comprises:
(a) one section with multiple discrete reflecting surfaces with a common orientation to reflect images of objects at the rear of the vehicle toward a viewer's eye location, and other sections with discrete reflecting surfaces oriented to reflect images of objects at the rear flanks of the vehicle toward the viewer's eye location,
(b) there being a mirror transition zone between said sections characterized by discrete reflecting surfaces certain of which reflect said images of objects at the rear of the vehicle toward the viewer's eye location, and others of which reflect said image of objects at the rear flanks of the vehicle toward the viewer's eye location.

24. The mirror of claim 23 wherein said certain and other surfaces are interspersed.

25. The mirror of claim 24 wherein the areal density of said certain surfaces diminished in a direction from said one section toward said other section, over the transition zone, and the areal density of said other surfaces diminished in a direction from said other section toward said one section, over the transition zone.

26. The mirror of claim 23 having a support with a flat side adhered to the side of a glass plate furthest from the driver, such that said reflecting surfaces are still further from the driver.

27. The mirror of claim 26 having a V-shaped profile, with an apex directed generally toward the driver.

28. The mirror of claim 23 wherein the reflecting surfaces of said other sections define generally convex section surfaces.

* * * * *